W. F. ZIMMERMANN.
GEAR GENERATING MACHINE.
APPLICATION FILED MAY 18, 1915.
1,222,709.
Patented Apr. 17, 1917.
2 SHEETS—SHEET 1.
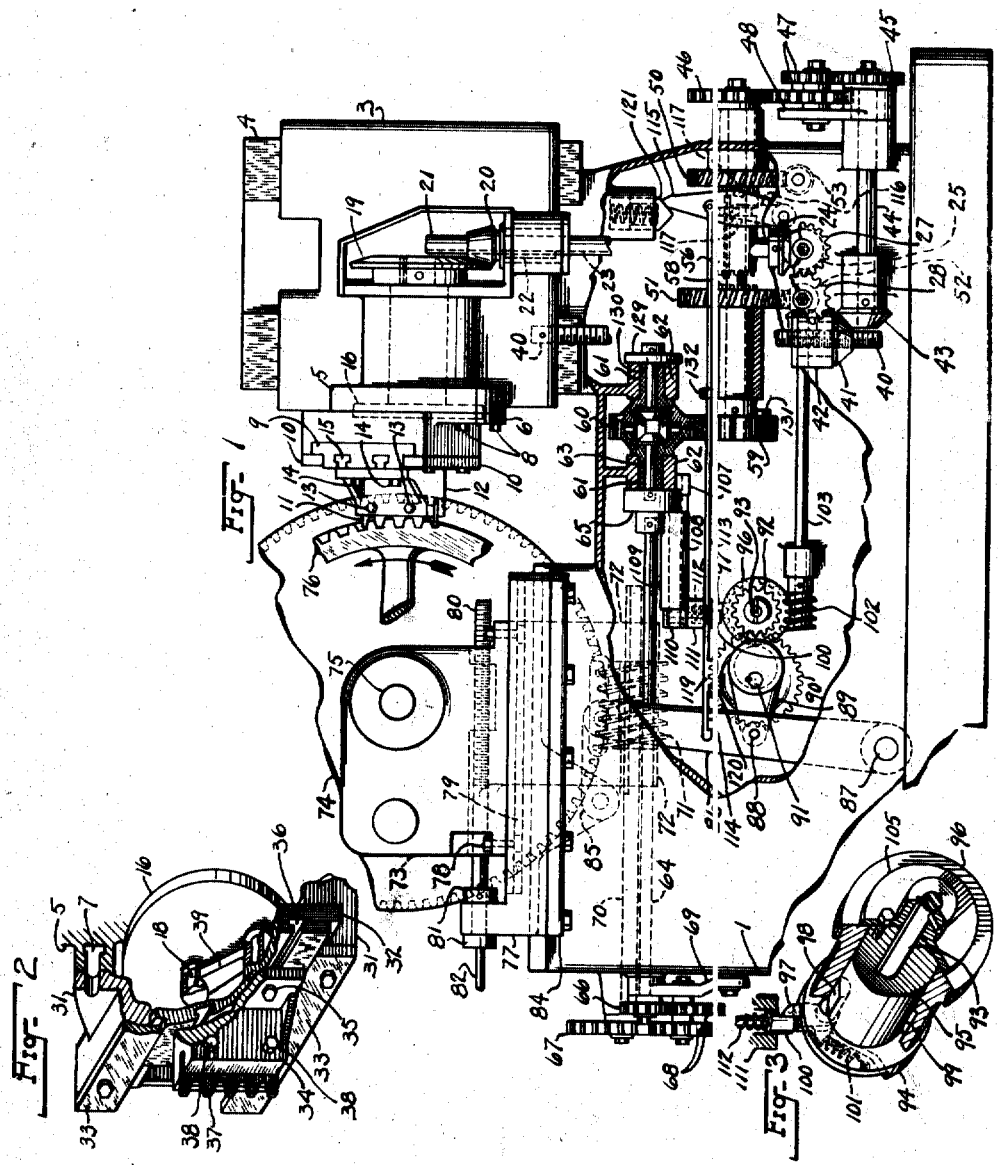
INVENTOR
William F. Zimmermann

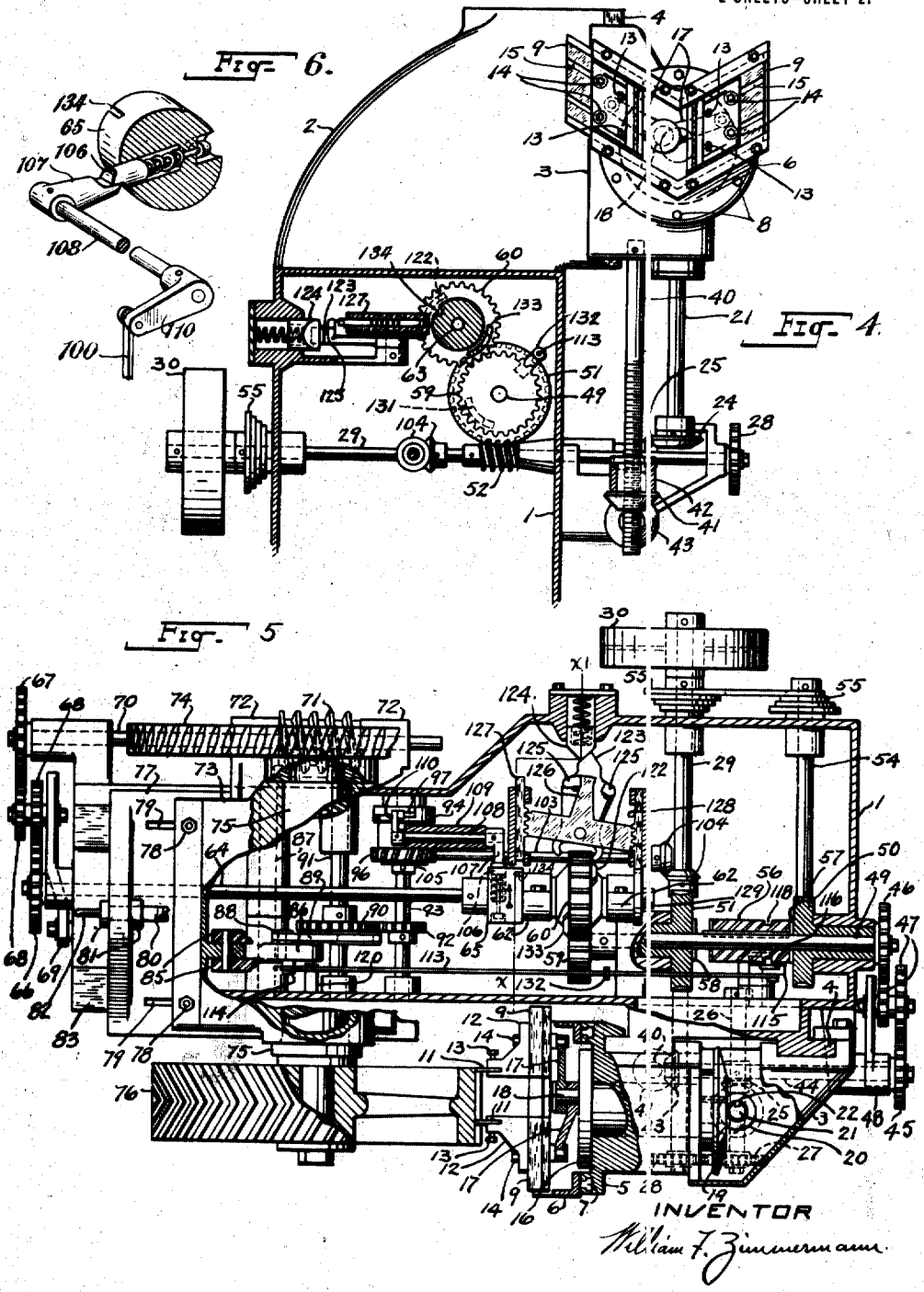

UNITED STATES PATENT OFFICE.

WILLIAM F. ZIMMERMANN, OF NEWARK, NEW JERSEY, ASSIGNOR TO GOULD & EBERHARDT, OF NEWARK, NEW JERSEY, A CORPORATION OF NEW JERSEY.

GEAR-GENERATING MACHINE.

1,222,709.   Specification of Letters Patent.   Patented Apr. 17, 1917.

Application filed May 18, 1915. Serial No. 28,817.

*To all whom it may concern:*

Be it known that I, WILLIAM F. ZIMMERMANN, a citizen of the United States, and a resident of Newark, in the county of Essex and State of New Jersey, have invented certain new and useful Improvements in Gear-Generating Machines, and do hereby declare the following specification, taken in connection with the drawings forming part of same, to be a full, clear, concise, and exact description of the invention, and the best mode contemplated to apply the principle thereof, so as to distinguish it from other inventions and to enable any person skilled in the art to which it appertains or with which it is most nearly connected to make, construct, and use the same.

This invention relates primarily to machines adapted to generate the tooth form on spur, helicoidal or helical, and double twisted spur or herring-bone gear wheels, and more particularly to that class of gear tooth generating machines which have one or more reciprocatory cutting tools.

The primary object of this invention is to provide an organization capable of planing the tooth curves on one or more teeth of a gear wheel, by feeding the reciprocating tools and gear wheel relatively to each other and tangentially to the gear wheel, and simultaneously rotating the gear wheel relative to said tangential feeding motion of the tools until the tooth form is completed on one or a series of teeth; indexing either the gear wheel or tools to present an unfinished portion of the gear wheel to the cutting action of the tools, then repeating this cycle of operations until all the teeth in the gear wheel have their tooth curves completed.

Another object is to generate the tooth curves of the converging angles of herring-bone gear wheels by actuating the cutting tools alternately from opposite edges of the gear blank in a direction corresponding to said converging angles.

Other objects will be apparent from, and are incorporated in the annexed drawings, and in the following description, which sets forth in detail, certain contrivances embodying means, constituting however, but one of the various mechanical forms in which the principle of the invention may be used.

The novelty of the invention will be readily understood from the drawings, which show a construction for practising the invention in its preferred form, and from the following description thereof, and is more specifically pointed out and distinctly claimed in the claims annexed to said description.

In the drawings:—

Figure 1 is a side elevation of the machine, illustrating an organization of parts so arranged as to cut the teeth of double twisted spur or herring-bone gear wheels, and is shown partly in section, so that the construction may be more clearly understood.

Fig. 2 is a supplemental cutter head, which is used to cut the teeth of spur and helical gear wheels, and which can also be used to cut double twisted spur gear wheels by cutting, first all of the teeth having the same angular direction and then those teeth with the opposite angle.

Fig. 3 is an isometric view of the clutch mechanism to move the gear blank clear of the cutting tools during indexing.

Fig. 4 is an end section at X $X_1$ of Fig. 5, which clearly illustrates the arrangement of the cutting tools for double twisted spur gears.

Fig. 5 is a plan view partly in section, to exhibit the interior mechanism.

Fig. 6 is an isometric view of the work carriage tripping device.

Referring to the drawings, frame 1 is provided with a stanchion 2 at one end thereof, preferably cast integral therewith.

A cutter carriage 3 is slidably arranged upon suitable guideways 4, which are formed on the stanchion 2. The cutter carriage 3 is provided with a cylindrical part 5, to which is secured the cutter head 6. T slots 7 in the cylindrical head 5 are for the T bolts 8, which clamp the cutter head 6 to the cutter carriage 3.

In the cutter head 6 two tool slides 9, are slidably mounted at an angle to each other and in guide ways formed by the cutter head 6 and straps 10. Two tools 11, each of which consists of a series of cutting teeth are secured to the tool heads 12 by the bolts 13. The tool heads 12 are adjustably arranged on the tool slides 9 and secured thereto by the bolts 14 and T slots 15.

The actuating mechanism for the tools 11 consists of a driving crank plate 16 revolubly mounted in the cutter slide 3 and connected to the tool slides 9 by the links 17. One end of each of the links 17 is pivotally arranged on the crank pin 18 which is secured to and revolved by the crank plate 16 and the other end of each link 17 is pivotally connected to one of the tool slides 9. The crank pin 18 is mounted eccentrically upon the crank plate 16 and is secured in a permanent position.

The crank plate 16 has secured thereon and is rotated by the bevel gear 19, which meshes with the bevel pinion 20 rotatably mounted in the cutter slide 3 and slidably keyed to the vertical shaft 21 by the key 22 and spline 23. A bevel gear 24 is secured to the lower end of the vertical shaft 21 and meshes with the bevel gear 25, secured to and rotatable with the horizontal shaft 26. A change wheel 27 connected to one end of the horizontal shaft 26 meshes with a change gear 28 secured to the pulley shaft 29. A driving pulley 30 which can be connected to any suitable source of power is secured to and rotates the shaft 29.

The mechanism described constitutes means for reciprocating the cutting tools. The ratio of the change gears 28 and 27 may be varied so that the tools will be actuated the desired number of strokes per minute. It is to be noted that the links are so connected to the tool slides that when one cutting tool approaches the center the other recedes. This arrangement of cutting tools is particularly adapted for the cutting of double twisted spur or herringbone gear wheels that have a helicoidal angle corresponding to the angular movement of the tool slides in the cutter head.

If spur gears, or helical gears that have only one angular direction, are to be cut, the cutter head and tool parts shown in Fig. 2 are substituted for the double angular cutter head shown in the other figures.

Referring particularly to the supplemental head shown in Fig. 2, the cutter head 31 is similar to the cutter head 6 of Fig. 5, and is provided with a tool slide 32, arranged in guide-ways formed by said cutter head 31 and the straps 33. The guide-ways in this case are arranged across the face of the cutter head. The tool head 34 is adjustable upon the tool slide 32 and secured thereto by the bolts 35 and T slots 36. The cutter 37, consisting of a series of cutting teeth, is clamped to the tool head 34 by the bolts 38. The single connecting link 39, pivotally mounted upon the crank pin 18, connects the crank plate 16 with the tool slide 32. The crank plate 16 and pin 18, are the same whether the double angular or single tool slide is used. The single tool slide shown in Fig. 2, can be adjusted in any angular position and clamped to the cutter carriage 3 by means of the T slots 7 and bolts 8.

The mechanism to feed the cutter tangentially to the gear blank to be cut will now be described.

The feed screw 40 is secured to the lower end of the cutter slide 3 and co-acts with the threaded portion of the bevel gear 41 which is rotatably mounted in the lower bearing 42. The bevel gear 43 secured to the feed shaft 44 meshes with the internally threaded bevel gear 41. The change gear 45 secured to the other end of the feed shaft 44 is connected to the change gear 46 by means of the compound gears 47 and the adjustable shoe 48. The ratio of these change gears is varied in accordance with the pitch of the gear to be cut. The change gear 46 is secured to a feed reversing shaft 49 rotatably mounted within two oppositely rotating worm wheels 50 and 51.

The reversing worm wheel 51 receives its motion from the pulley shaft 29 through the worm 42. The feed worm wheel 50 meshes with the worm 53 secured to, and rotatable with the feed worm shaft 54, the latter being connected to and rotated from the pulley shaft 29 by means of the cone pulleys 55 and any suitable belt. The purpose of the cone pulley arrangement is to provide means to vary the rate of feed to the cutting tools.

A clutch 56 is slidably keyed to the feed reversing shaft 49 and is provided with clutch teeth on each end thereof adapted to connect alternately with the clutch teeth 57 and 58 provided upon the worm wheels 50 and 51 respectively. When the reversing clutch 56 is connected with the worm wheel 50, the tools are given a slow upward feeding motion. When the reversing clutch is moved to engage with the worm wheel 51, the tools are rapidly moved in a downward direction. The controlling of the upward and downward feeding motions will be hereinafter more fully described.

A spur gear 59 is secured to the other end of the reversing shaft 49 and meshes with a second spur gear 60, both gears being of equal diameter. The gear 60 which is made in two parts, to form the housing of a set of differential bevel gears, is provided with projecting hubs 61 on each side thereof rotatably mounted in cap bearings 62. The differential bevel gear 63 is connected to the index driving shaft 64 by a coupling 65. The index driving shaft 64 extends through the frame 1 and has secured to the end thereof a change gear 66 which is connected to the change gear 67 by means of the compound gears 68 and the adjustable arm 69. The change gear 67 is secured to the index worm shaft 70 to which the index worm 71 is slidably keyed. The index worm 71 is arranged between the bearings 72 on the work head 73, and meshes with the index wheel 74 which is secured to, and rotates the work spindle 75. The gear blank 76 to be cut, is mounted upon and secured to the work spindle 75. The work head 73 is adjustably mounted upon the supplemental slide 77 and is secured in position thereto by the T bolts 78 and T slots 79. A screw 80 is rotatably mounted in said supplemental slide 77 and is held from endwise movement by the collars 81 and co-acts with the threaded portion of the work head 73. The end of said screw 80 is provided with a square 82 to receive a crank handle whereby the work head and therewith the work blank can be adjusted toward and from the cutters 11.

The supplemental slide 77 is slidably mounted upon guideways 83 arranged upon the frame 1. The clamping plates 84 are so adjusted that the supplemental slide 77 can be readily moved on said frame. Beneath the supplemental slide 77 is pivoted a link 85, connecting said supplemental slide to the lever 86. The lever 86 is pivoted in the frame at 87 and is arranged to move the supplemental slide, and with it the work head and work blank a predetermined distance toward and from the cutter.

The mechanism for automatically moving the work blank toward and from the cutter will be hereinafter more fully described.

The lever 86 has pivoted to it at 88 the eccentric arm 89 which is eccentrically mounted upon a gear 90 secured to and rotatable with the crank shaft 91. A pinion 92 meshes with said crank gear 90 and is suitably secured to a clutch shaft 93. The said gears 90 and 92 have a ratio of one to two so that for each rotation of the pinion 92 the gear 90 and eccentric arm 89 rotate a half revolution. A clutch member 94 is keyed to one end of the clutch shaft 93 and is provided with a hub 95 upon which a worm wheel 96 is rotatably mounted. See Fig. 3. A flange 105 keyed to the shaft 93 and bolted to the hub 95 prevents endwise separation of the clutch members. The clutch member 94 and worm wheel 96 are periodically connected by means of a latch 97 which is rotatably mounted in an eccentric position in the clutch member 94. The latch 97 has a portion of the cylindrical end 98 cut away so that the remaining portion can be rocked to engage with the slot 99 in the worm wheel 96 and thereby connect the clutch member 94 to the rotating worm gear 96. When the latch 97 is in the position shown in Fig. 3, the worm wheel 96 rotates freely upon the hub 95 and whenever the stop bolt 100 is withdrawn from contact with the latch 97 the spring 101 will rock the latch and bring the cylindrical part 98 into the path of the slot 99. The worm wheel 96 meshes with a worm 102 secured to and rotatable with a shaft 103 which receives its rotary motion directly from the pulley shaft 29 through the bevel gears 104.

The purpose of the clutch mechanism just described, which is connected to the lever 86, is to move and maintain the wheel blank 76, to be cut, clear of the reciprocating tools 11 during what may be termed the indexing period, and to again return said wheel blank to the operative position.

The sequence of the various motions, constituting a complete cycle, will be readily ascertained from the statement of operation of the entire arrangement, immediately following which also includes a detailed description of the controlling devices.

In general the machine shown in the drawings operates by feeding the reciprocating tools upwardly a distance equal to one or more teeth to be cut in the blank and simultaneously rotating the blank relatively to such feeding motion. The feeding motion continues until the index shaft 64 has made one complete revolution in the direction of the arrow shown in Figs. 1 and 5 and the spring pressed trip plunger 106 has come in contact with the trip lever 107 and moved the latter until the stop bolt 100 is raised clear of the latch 97. The trip lever 107 is connected to the stop bolt 100 by means of a rock shaft 108 mounted in the bearing 109 and the lever 110 which is secured to said rock shaft 108 and actuates the stop bolt 100 vertically in the bearing 111. A spring 112 tends to keep the stop bolt 100 in contact with the latch 97.

Releasing the latch 97 from the stop 100 clutches the continuously rotating worm wheel 96 to the clutch member 94 and rotates the gear 92 one revolution. The gear 92 rotates the gear 90 one-half revolution and thereby moves the eccentric arm 89 to its extreme position to the left as viewed in Fig. 1. The movement of the eccentric as hereinbefore described, actuates the lever 86 to move the work carriage 77 and therewith the work blank 76 clear of the cutting tools 11.

The movement of the lever 86 to the left carries with it the trip rod 113 which is in contact with the abutment 114, integral with said lever 86. The trip rod 113 actuates the reversing clutch 56 through a lost motion lever 115 which is provided with contacts 117 to actuate the clutch lever 116. An annular groove 118 is provided in the reversing clutch 56 in which the clutch lever 116 is arranged so as to move said clutch from engagement with the feed worm wheel 50 to the reverse worm wheel 51 and back again. The trip rod 113 is provided with a cam surface 119 which slides on a similar surface 120 secured to the frame 1 to disconnect said trip rod 113 from the lever 86 when the lost motion lever 115 has been moved sufficiently to permit the spring plunger 121 to act and complete the movement of the clutch 56 to engage with the reverse worm wheel 51.

Simultaneously with the movement of the reversing clutch 56 the cam 122, on the gear 60 which forms the differential gear casing, actuates the lost motion lever 123 until the spring plunger 124 urges said lost motion lever 123 farther, whereupon the contacts 125 move the segment lever 126 to the left of the position shown in Fig. 5. Movement of the segment lever 126 to the left will move the rack stop bar 127 into engagement with the notch 134 provided in the coupling 65 and thereby stop the rotary motion to the work blank. At the same time a similar rack stop bar 128 is withdrawn from the disk 129 which is secured to the differential gear 130. This permits any further rotary movement of the gear 60 to dissipate through the differential gear 130 without affecting any other mechanism.

At this part in the cycle of the operation the cutters will be rapidly moved downward by means of the reversing worm wheel 51, change gears 45, 46 and 47, and the feed screw 40, until the cam 131 on the spur gear 59 actuates the stop 132 on the trip rod 113 to the right as seen in Figs. 1 and 5 to again engage the reversing clutch 56 with the feed worm wheel 50. The cam 131 is so arranged that in reversing, the gear 60 is rotated a little more than one revolution so that when the feeding motion is commenced the backlash or freedom in the feed train can be all taken up before the cutters again come in contact with the work.

To start the rotary movement of the work spindle a cam 133 is provided upon the gear 60 to actuate the lost motion lever 123 when said gear 60 is rotated opposite to the direction of the arrow and during the time that the additional part of a revolution is made in reversing as above referred to, the cam 133 releases the coupling 65 from the stop bar 127 and arrests the motion of the stop plate 129 thereby starting the rotary movement to the blank in synchronism with the upward feeding motion of the tools. The additional part of a full revolution made by the gear 60 in reversing is utilized, when said gear is again rotated in the direction of the arrow, to take up the backlash and freedom in the feeding and blank rotating mechanism, and to again trip the lever 107 to release the latch 97 and thereby return the work blank into cutting relation with the tools.

The change gears 66, 67 and 68 are proportioned in accordance with the number of teeth to be cut and the change gears 45, 46 and 47 are arranged according to the pitch of the gear to be cut. It will be noticed that the shaft 64 is rotated one revolution in the direction of the arrow for feeding in each cycle of operations and then stops until the gear 60 has completed one revolution in reversing whereupon both feed and blank rotating means are simultaneously reversed a part of a complete revolution before the cam 133 again engages the feed gear train. The distance that the cutters are moved when disconnected from the blank rotating mechanism is equal to the pitch of the gear to be cut and is equivalent to indexing the gear one tooth.

Having described my invention and its mode of operation, I desire to secure by Letters Patent:

1. In combination with a work spindle, a cutter head, a tool slide, a second tool slide angularly disposed to said first slide, a driving member, a link connecting said driving member to said first tool slide, a second link connecting said driving member to said second tool slide, said links arranged to angularly reciprocate said tool slides, means to feed said tools at right angles to said work spindle, means to simultaneously rotate said spindle relative to said feeding motion, and means to periodically index said work spindle and tools in accordance with the number of teeth to be cut.

2. In combination with a work spindle, cutting tools arranged to reciprocate relatively to said spindle, means to feed said tools upwardly at right angles to said spindle, means to simultaneously rotate said spindle relatively to said feeding motion, means to periodically lock said spindle and to lower said cutting tools, and means to again unlock said spindle toward the end of the cutter lowering movement, thereby reversing the motion of the index wheel before again rotating same relative to the cutter feeding movement.

3. In combination with a work spindle, cutting tools arranged to reciprocate relatively to said spindle, feeding and reversing means for said cutting tools to move said tools at right angles to said spindle, an index shaft, connections between said index shaft and feeding means, other connections between said index shaft and work spindle whereby said work spindle is rotated relatively to said cutter feeding motion, means to periodically lock said index shaft and return said cutting tools, and means to again unlock said index shaft toward the end of the cutter lowering movement.

4. In combination with a work spindle, cutting tools arranged to reciprocate relatively to said spindle, feeding and reversing means for said cutting tools, an index shaft, connections between said index shaft and work spindle, a differential connection between said index shaft and said feeding and reversing means, means to periodically lock said index shaft and unlock said differential connection, means to connect said cutter reversing means to return said cutting tools relatively to said work spindle, and means to again unlock said index shaft and lock said differential, whereby said work spindle is again connected with said feeding means.

5. In combination with a work spindle, cutting tools arranged to reciprocate relatively to said spindle, feeding and reversing means to move said cutting tools at right angles to said spindle, an index shaft, connections between said index shaft and work spindle, a differential connection between said index shaft and said feeding and reversing means, comprising a gear wheel wherein differential gears are mounted, a second gear wheel meshing with and rotating said first mentioned gear wheel, a lock bolt for said index shaft, a second lock bolt for said differential, said locking bolts arranged to automatically lock and unlock said index shaft and differential alternately, two cams on said first mentioned gear wheel to actuate said locking bolts, one of said cams arranged to lock said index shaft at the end of the cutter feeding movement and to unlock said differential, the other cam arranged to unlock said index shaft and lock said differential at the end of the cutter return movement.

6. In combination with a work spindle, cutting tools arranged to reciprocate relatively to said spindle, feeding and reversing means to move said cutting tools at right angles to said spindle, an index shaft, connections between said index shaft and work spindle, a differential connection between said index shaft and said feeding and reversing means, means to lock and unlock said index shaft and differential respectively to permit changing the relative positions of said spindle and cutting tools, and means to again unlock said index shaft and lock said differential thereby connecting said spindle with said cutter feeding means.

7. In combination with a work spindle, cutting tools arranged to reciprocate relatively to said spindle, feeding and reversing means to move said cutting tools at right angles to said spindle, an index shaft, connections between said index shaft and said feeding and reversing means, a differential connection between said index shaft and said feeding and reversing means, means actuated by said index shaft to move said spindle clear of said cutting tools and to return same, means controlled by said differential to lock said index shaft and permit the lowering of said cutting tools, and other means controlled by said differential to unlock said index shaft thereby again connecting said spindle with said feeding means.

8. In combination with a work spindle, cutting tools arranged to reciprocate relatively to said spindle, feeding and reversing means to move said cutting tools at right angles to said spindle, an index shaft connected to said spindle, a reversible member controlled by said feeding and reversing means, a locking bolt for said index shaft and means actuated by said reversible member to periodically lock and unlock said index shaft.

9. In combination with a work spindle, cutting tools arranged to reciprocate relatively to said spindle, feeding and reversing means to move said cutting tools at right angles to said spindle, an index shaft connected to said spindle, a reversible member controlled by said feeding and reversing means, and means controlled by said reversible member to connect and disconnect said index shaft and reversible member.

WM. F. ZIMMERMANN.